(12) United States Patent
Grimanis et al.

(10) Patent No.: US 12,060,803 B2
(45) Date of Patent: Aug. 13, 2024

(54) SPLIT POLYMER LABYRINTH SEAL ASSEMBLY

(71) Applicant: A.W. Chesterton Company, Groveland, MA (US)

(72) Inventors: Michael P. Grimanis, Wayland, MA (US); Joseph K. Kaleshian, Burlington, MA (US)

(73) Assignee: A.W. CHESTERTON COMPANY, Groveland, MA (US)

( * ) Notice: Subject to any disclaimer, the term of this patent is extended or adjusted under 35 U.S.C. 154(b) by 0 days.

(21) Appl. No.: 17/868,615

(22) Filed: Jul. 19, 2022

(65) Prior Publication Data

US 2023/0016933 A1 Jan. 19, 2023

Related U.S. Application Data

(60) Provisional application No. 63/223,426, filed on Jul. 19, 2021.

(51) Int. Cl.
 *F01D 25/18* (2006.01)
 *F01D 11/00* (2006.01)
 (Continued)

(52) U.S. Cl.
 CPC .......... *F01D 25/183* (2013.01); *F01D 11/003* (2013.01); *F01D 11/02* (2013.01); *F16J 15/447* (2013.01); *F05D 2240/55* (2013.01)

(58) Field of Classification Search
 CPC .... F16J 15/00; F16J 15/16; F16J 15/50; F16J 15/52; F16J 15/447; F16J 15/4472; F16J 15/4474; F16J 15/4476; F16J 15/4478; F01D 25/00; F01D 25/18; F01D 25/183; F01D 25/186; F01D 11/00; F01D 11/003; F01D 11/02; F01D 11/025; F05D 2240/00; F05D 2240/55–58; F05D 2240/581
 (Continued)

(56) References Cited

U.S. PATENT DOCUMENTS 3,507,314 A    4/1970 Zartler
6,685,191 B2 *  2/2004 Toal ..................... F16J 15/3464
                                                      277/352

(Continued)

FOREIGN PATENT DOCUMENTS

WO         99/31414 A1    6/1999
WO    WO-9931414 A1 *    6/1999    ........... F16J 15/3488

OTHER PUBLICATIONS

WO-9931414-A1, Cid (Year: 1999).*
International Search Report and Written Opinion, PCT/US2022/037631, dated Oct. 12, 2022, 17 pages.

*Primary Examiner* — Nathan Cumar
(74) *Attorney, Agent, or Firm* — Nelson Mullins Riley & Scarborough LLP; Anthony A. Laurentano

(57) ABSTRACT

A split labyrinth seal assembly having split stationary and rotary sealing elements, and a split clamping mechanism. The clamping mechanism is configured to secure the rotary element to a rotating shaft. The rotary element can also include an integrally formed valve element that moves between a contacting and a non-contacting position in response to rotation of the shaft. The rotary element and the clamping mechanism can have surface features associated therewith to promote nesting between the components.

15 Claims, 17 Drawing Sheets

(51) Int. Cl.
*F01D 11/02* (2006.01)
*F16J 15/447* (2006.01)

(58) Field of Classification Search
USPC .......................................................... 277/399
See application file for complete search history.

(56) References Cited

U.S. PATENT DOCUMENTS

| | | |
|---|---|---|
| 9,366,340 B2 | 6/2016 | Grimanis et al. |
| 9,546,734 B2 * | 1/2017 | Cid ...................... F16J 15/3488 |
| 2007/0090605 A1 * | 4/2007 | Grimanis ................. F16J 15/36 |
| | | 277/370 |
| 2014/0159315 A1 * | 6/2014 | Cid ...................... F16J 15/3488 |
| | | 29/428 |
| 2015/0211639 A1 * | 7/2015 | Grimanis ............... F16J 15/447 |
| | | 277/303 |

* cited by examiner

SPLIT POLYMER LABYRINTH SEAL ASSEMBLY

RELATED APPLICATION

The present application claims priority to U.S. provisional patent application Ser. No. 63/223,426, filed on Jul. 19, 2021, and entitled Split Polymer Labyrinth Seal Assembly, the contents of which are herein incorporated by reference.

BACKGROUND OF THE INVENTION

The present invention relates to a seal assembly for sealing a shaft or a rod relative to a stationary housing component. The present invention relates generally to rotary shaft seals. More particularly, the present invention relates to a labyrinth seal for sealing a fluid within the housing and for helping prevent contaminates from entering the same.

Polymer and rubber mechanical seal assemblies are employed in a wide variety of environments and settings, such as for example in mechanical apparatuses, to provide a fluid-tight seal. The sealing assemblies are usually positioned about a rotating shaft or rod that is mounted in and protrudes from a stationary mechanical housing. The rotary seal is generally constructed and designed so as to try to prevent unwanted particles from entering the machine housing and contaminating a fluid contained therein, but the seal must also retain fluid, such as oil, process fluid or a barrier fluid, typically located in a fluid reservoir inside the housing. Hence, the need for minimizing leakage while prolonging the machine's operating life is important, as the demands for reliability and the penalties for failure continue to rise.

Those of ordinary skill in the art will readily recognize that it is typically difficult to maintain rotating equipment because of extreme equipment duty cycles, the lessening of service factors, the particular seal design, and the lack of spare rotating equipment in many processing plants. Various forms of conventional shaft sealing devices have been utilized in the art to try to protect the integrity of the seal environment, including lip seals, labyrinth seals, magnetic seals, and the like.

Conventional lip seals include a sealing element with a lip that helps prevent leakage of fluid from the housing by contacting the rotating shaft. A drawback of conventional lip seals is that they can quickly wear out and fail over time, and are also known to permit the unwanted migration of excessive amounts of moisture and other contaminants into the fluid reservoir of the housing.

A labyrinth seal is typically a non-contacting frictionless seal that includes no friction, given that there is no sealing contact between the stationary component and the revolving component during use. The labyrinth seal is capable of creating a seal and preventing contaminants from reaching the fluid within the housing by creating a complicated path (i.e., a labyrinth) for liquids and contaminants to pass through, thus making it challenging for them to cross the barrier created by the seal because they have difficulty passing or traversing through the labyrinth. These types of seals are used in a variety of settings and can be used on objects which rotate and otherwise move. Indeed, movement, such as shaft rotation, can often make the labyrinth seal even more effective, depending on the design, by creating a centrifugal force that further serves to trap contaminants and fluids within the seal. While a labyrinth seal is typically not designed to handle pressure differentials, it can be used in many other types of important environments.

A drawback of conventional labyrinth seals is that that they are expensive and typically have complex designs that require tight tolerances. Any movement of the parts of the seal from their default positions during operation results in increased fluid leakage and a reduction in the ability of the seal to prevent contaminants from entering the mechanical housing. In addition, conventional labyrinth seals typically have a solid, continuous construction, which dictates disassembly of the rotary equipment for their installation.

SUMMARY OF THE INVENTION

It is therefore an object of the present invention to provide a labyrinth type seal that employs rotary and stationary seal ring components that can be easily positioned relative to each other for enhanced fluid sealing and debris containment. More significantly, the components are split and can be easily installed on the equipment without disassembly.

It is also an object of the present invention to provide a labyrinth type seal that employs a valve element as part of the seal assembly that is selectively movable between non-contacting and contacting seal positions. The valve closes when the rotating shaft stops and prevents any contaminants (e.g. moisture) from entering the fluid reservoir.

The labyrinth seal assembly of the present invention is directed to a split seal having split stationary and rotary sealing elements, and a split clamping mechanism. The clamping mechanism is configured to secure the rotary element to a rotating shaft. The rotary element can also include an integrally formed valve element that moves between a contacting and a non-contacting position in response to rotation of the shaft.

The present invention is directed to a labyrinth seal assembly for forming a seal between a shaft and a stationary equipment housing. The labyrinth seal assembly includes a stationary element, a rotary element, and a clamping assembly. The stationary element is configured to be coupled to the stationary equipment housing and has an annular shape defining a space through which the shaft extends. The stationary element is split into a first stationary element segment and a second stationary element segment, wherein each of the stationary element segments has first and second non-flat end faces associated therewith. The rotary element is disposed within the space between the stationary element and the shaft and coupled to the shaft so as to rotate therewith. The rotary element is split into a first rotary element segment and a second rotary element segment, wherein each of the rotary element segments has first and second non-flat end faces associated therewith. The rotary element also has an outer surface having an integrally formed valve element extending axially outwardly therefrom. The clamping assembly is disposed about the rotary element for securing the rotary element to the shaft. The valve element is disposed between the stationary element and the rotary element when assembled, and the valve element is positioned relative to a portion of the stationary element to selectively form a seal. The valve element is movable between a contacting position and a non-contacting position in response to rotation of the shaft and is adapted to contact the stationary element in the contacting position to form the seal when the shaft ceases rotation and is disposed in the non-contacting position when the shaft rotates.

According to the present invention, the rotary element includes a main body having an inner surface, an opposed outer surface, a top surface having a surface feature associated therewith, and an outboard portion extending axially outwardly from the top surface. The clamping assembly has a main body having a bottom surface having a surface feature associated therewith that is complementary in shape to the surface feature of the top surface of the rotary element, such that the surface feature of the bottom surface of the clamping assembly is disposed in mating contact with the surface feature of the top surface of the rotary element. The surface feature of the top surface of the rotary element can be, in one embodiment, a channel and the surface feature of the clamping assembly includes a projection sized and dimensioned for seating in the channel. According to another embodiment, the outboard portion of the rotary element can optionally include an outer surface having one or more surface features associated therewith. The inner surface of the main body of the clamping assembly has one or more surface features associated therewith that are complementary in shape to the surface features of the outboard portion of the rotary element. According to one embodiment, the surface features of the outer surface of the outboard portion of the rotary element include one or more channels, and the surface features associated with the inner surface of the main body of the clamping assembly includes one or more protrusions sized and dimensioned for seating at least partly in the channels of the outboard portion.

The non-flat end faces of the first stationary element segment can be configured to include a cut-out and the non-flat end faces of the second stationary element segment can include a protrusion that is complementary in shape to the cut-out. The cut-out and the protrusion, when assembled together, prevent axial movement of the first and second stationary element segments relative to each other. Similarly, the non-flat end faces of the first rotary element segment include a cut-out and the non-flat end faces of the second rotary element segment include a protrusion that is complementary in shape to the cut-out, wherein the cut-out and the protrusion when mated together prevent axial movement of the first and second rotary element segments relative to each other. The split forming the non-flat end faces of the first and second stationary element segments and the rotary element segments can have a profile shape, when mated together, of an arrow or a chevron.

According to the present disclosure, the surface feature of the top surface of the rotary element is an axially outwardly extending projection, and the surface feature of the bottom surface of the main body of the clamping assembly includes a channel, such that the outwardly extending projection is disposed in mating contact with the channel formed in the bottom surface of the clamping assembly. The surface features of the outer surface of the outboard portion of the rotary element can include one or more channels, and the surface features associated with the inner surface of the main body of the clamping assembly can include one or more protrusions that are sized and dimensioned for seating at least partly in the channels of the outboard portion. The non-flat end faces of the first stationary element segment can include a cut-out and the non-flat end faces of the second stationary element segment include a protrusion that is complementary in shape to the cut-out. The cut-out and the protrusion when mated together prevent axial movement of the first and second stationary element segments relative to each other.

The clamping assembly of the present invention can include an annular main body having first and second end portions, wherein the first end portion includes a first retention mechanism and the second end portion includes a second retention mechanism, and a securing assembly. The securing assembly can include first and second barrel nuts and a fastener. The first barrel nut can be sized and dimensioned for seating within the first retention mechanism of the first end portion and the second barrel nut can be sized and dimensioned for seating within the second retention mechanism of the second end portion, wherein each of the first and second barrel nuts has an aperture formed therein. The fastener element can be sized and dimensioned for seating within the apertures of the first and second barrel nuts.

The first and second retention mechanisms can optionally include first and second loop elements. The first barrel nut is sized and dimensioned for seating within the first and second loop elements of the first retention mechanism and the second barrel nut is sized and dimensioned for seating within the first and second loop elements of the second retention mechanism. The rotary element has a main body having an inner surface, an opposed outer surface, and an outboard portion extending axially outwardly from a top surface. The outboard portion has a channel formed therein on an outer surface that is sized and dimensioned for seating the annular main body of the clamping mechanism. The fastener element, when mounted within the first and second barrel nuts and is tightened, couples the rotary element to the shaft.

BRIEF DESCRIPTION OF THE DRAWINGS

These and other features and advantages of the present invention will be more fully understood by reference to the following detailed description in conjunction with the attached drawings, in which like reference numerals refer to like elements throughout the different views. The drawings illustrate principals of the invention and, although not to scale, show relative dimensions.

FIG. 4 also illustrates a combination straight and V-shaped split in at least the stationary element.

DETAILED DESCRIPTION

Figure 1:
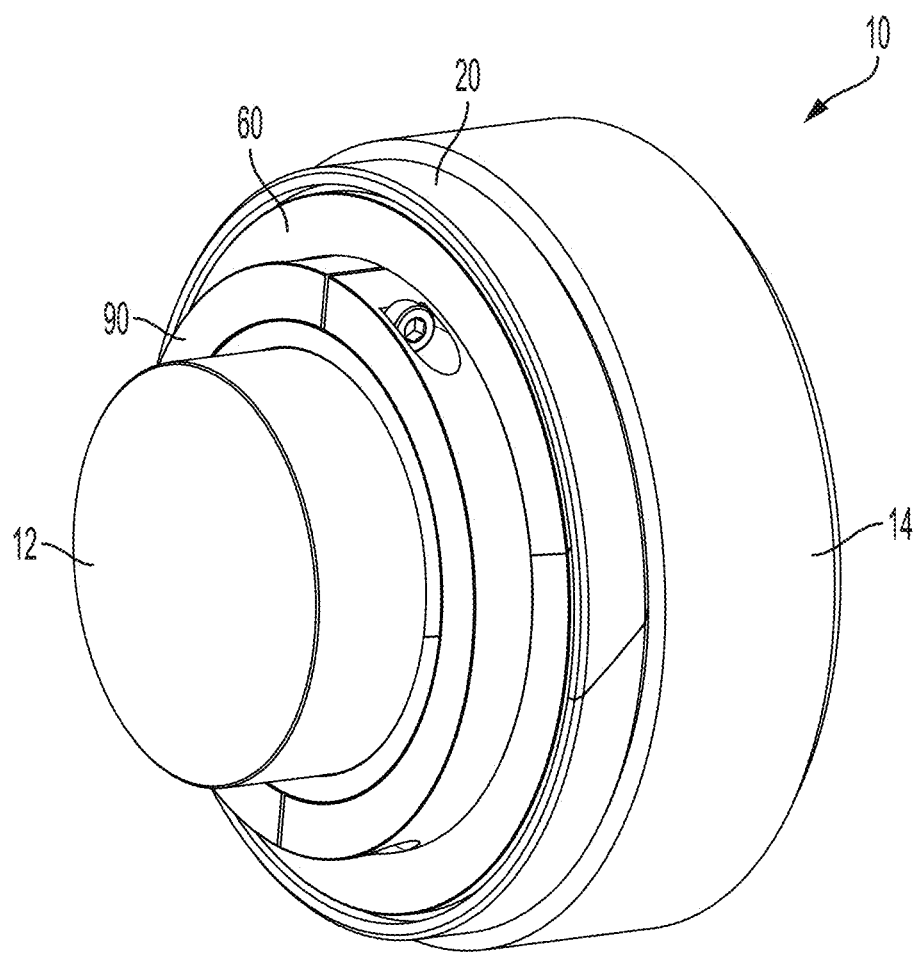
FIG. 1 is a perspective view of a first embodiment of a labyrinth seal assembly mounted about a shaft and disposed within a stationary equipment housing according to the teachings of the present invention.

The present invention provides a split polymer labyrinth type seal assembly for providing sealing on a rotating shaft or other suitable device. The labyrinth seal assembly also helps reduce the amount of particulates or fluid that enters or exits the mechanical housing by forming a labyrinth or winding path. The present invention is described below relative to the illustrated embodiments. Those skilled in the art will readily appreciate that the present invention can be implemented in a number of different applications and embodiments and is not specifically limited in its application to the particular embodiment depicted and disclosed herein. The split polymer labyrinth seal assembly of the present invention provides a method and system for installing the seal without disassembly of the equipment as is necessary with solid-continuous components.

The terms "mechanical seal," "seal assembly" and "sealing assembly" as used herein are intended to include various types of mechanical type seals or sealing assemblies, including for example labyrinth seals, single seals, split seals, concentric seals, and other known seal and sealing assembly types and configurations. The terms "labyrinth type seal assembly," "labyrinth seal assembly" and "labyrinth seal" are used interchangeably to refer to the labyrinth seal illustrated in the accompanying Figures.

The term "shaft" is intended to refer to any suitable rotatable device in a mechanical system and housed within the stationary equipment to which a seal can be mounted and includes shafts, rods and other known devices.

The terms "axial" and "axially" as used herein refer to a direction generally parallel to the axis of a shaft. The terms "radial" and "radially" as used herein refer to a direction generally perpendicular to the axis of a shaft. The terms "fluid" and "fluids" refer to liquids, gases, and combinations thereof.

The term "axially inner" as used herein refers to that portion of the stationary equipment and a seal assembly disposed proximate the mechanical system employing the seal assembly. Conversely, the term "axially outer" as used herein refers to the portion of stationary equipment and a seal assembly distal from the mechanical system.

The term "radially inner" as used herein refers to the portion of the seal assembly proximate a shaft. Conversely, the term "radially outer" as used herein refers to the portion of the seal assembly distal from the shaft.

The terms "mechanical housing," "stationary equipment," "stationary equipment housing" and/or "static surface" as used herein are intended to include any suitable stationary mechanical structure for housing a shaft or rod to which a seal assembly is secured or coupled thereto.

Labyrinth seals are typically constructed in multiple pieces. One piece, known as the stator or stationary element, is affixed to the stationary equipment housing and remains stationary. The other component, called the rotor or rotary element, is attached to the shaft and rotates therewith. The stationary and rotary sealing components typically cooperate in a frictionless, non-contacting manner to effectively seal out the majority of contaminants while holding in the lubricant or process fluid. Labyrinth seals are non-contacting, which means that the two opposing axial and radial faces of the sealing elements typically do not contact each other during use. The sealing components are also considered to be frictionless, as the rotary element and the stationary element are separated by a small gap defining a labyrinth path. All contaminants trying to enter the bearing housing typically must traverse the maze of turns and angles forming the labyrinth path and formed by the stationary element and the rotary element when assembled in order to reach the axial inner regions of the seal assembly and stationary equipment or housing. On the labyrinth path through all of these turns, particles are constantly subjected to centrifugal forces due to the rotational motion of the shaft, and only a very small number of contaminates ultimately pass through the entire length of the seal. This is the primary sealing function of a labyrinth seal assembly.

Figure 2:
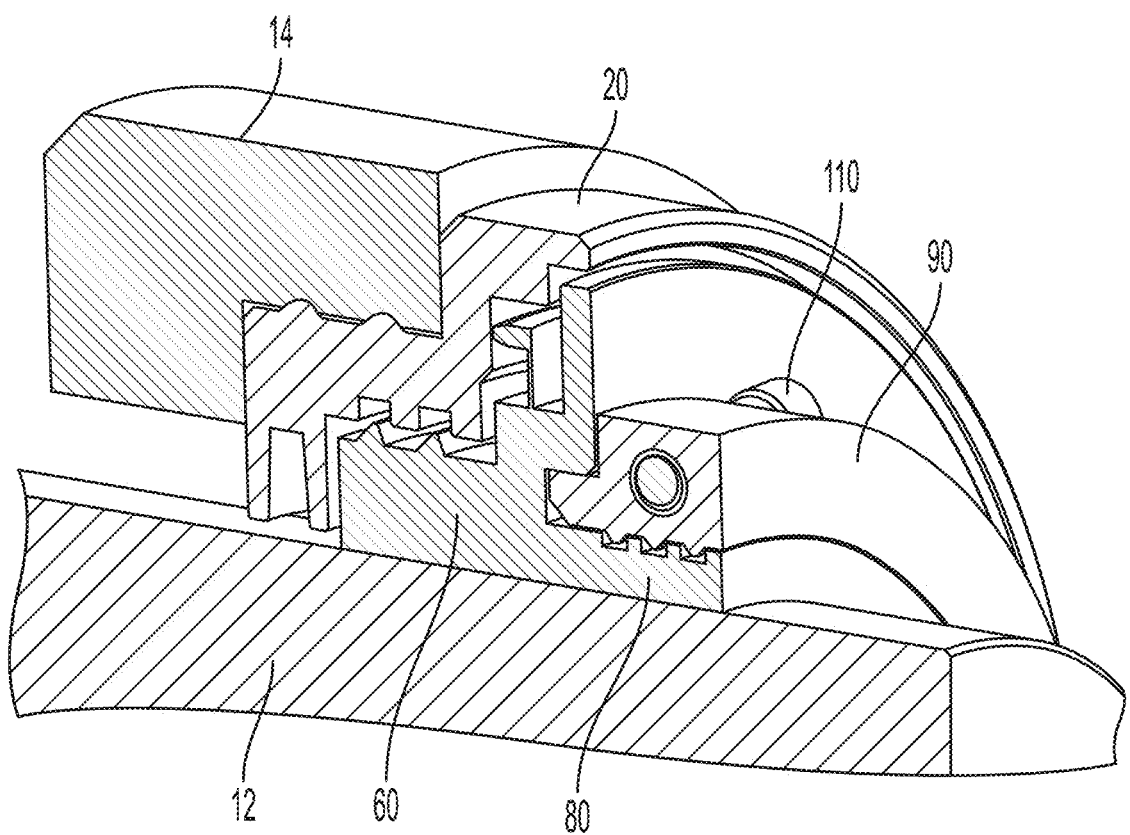
FIG. 2 is a partial cross-sectional perspective view of the labyrinth seal assembly of FIG. 1 according to the teachings of the present invention.
Figure 3:
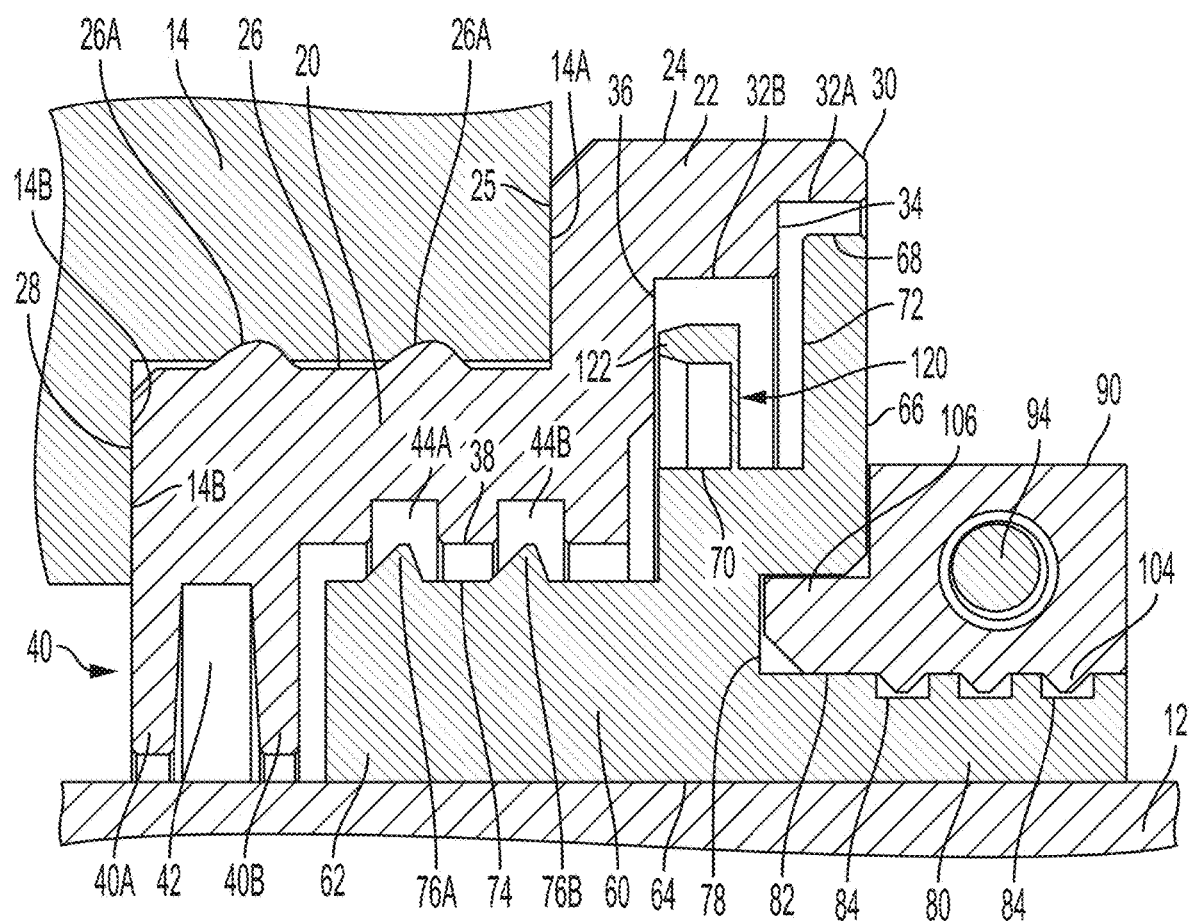
FIG. 3 is a partial cross-sectional view of the labyrinth seal assembly according to the teachings of the present invention.

According to one embodiment of the present invention, a split polymer labyrinth seal assembly 10 is provided that forms a seal between a shaft 12 and any associated stationary equipment 14. As shown for example in FIGS. 1-3, the labyrinth seal assembly 10 of a first embodiment of the present invention employs a stationary element 20 that is housed within the stationary equipment 14, a rotary element 60 that is coupled to the rotating shaft 12, a valve element that is coupled to or integrally formed with the rotary element 60 and is configured to operatively interact with the stationary element 20 so as to form a seal therebetween, and a split clamping mechanism or assembly 90 that serves to couple, clamp or secure the rotary element 60 to the shaft 12.

Figure 9:
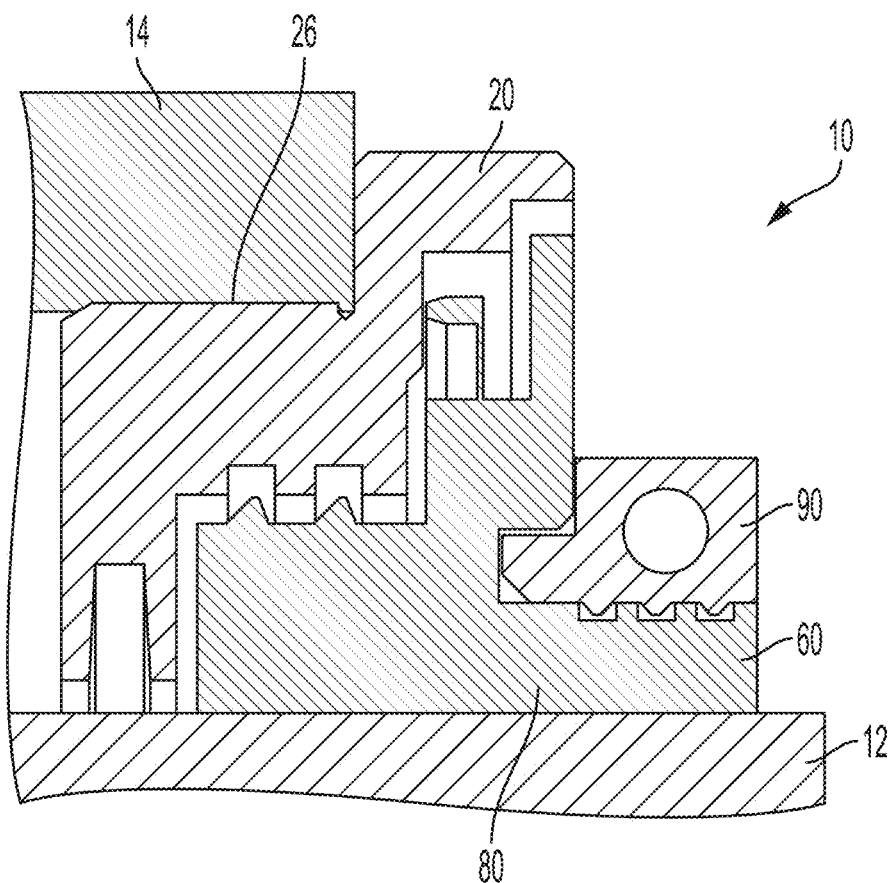
FIG. 9 is a partial cross-sectional perspective view of the labyrinth seal assembly showing another embodiment of the stationary element without static sealing elements according to the teachings of the present invention.

The illustrated stationary element 20 has a split annular shape and is configured to couple to the stationary equipment 14 so as to define a space through which the shaft 12 extends. The stationary element 20 is preferably split into corresponding stationary element segments (e.g., sealing segments). The stationary element 20 has a main body 22 that has an outer generally axially extending surface and an opposed inner generally axially extending surface. The outer surface can include multiple different surfaces. For example, the outer surface can include a radially outermost outer surface 24 and a radially inwardly stepped axially extending outer surface 26. The outer surfaces 24 and 26 can be coupled together by a radially extending stepped wall surface 25. The stepped wall surface 25 is configured to seat against a corresponding radially extending wall 14A of the stationary equipment 14. The radially innermost outer surface 26 of the main body 22 can be relatively flat or can optionally include or have formed thereon one or more static sealing surface elements or features, such as for example the boss elements 26A. The boss elements 26A can seat within corresponding grooves formed along an inner surface of the stationary equipment 14 to form a fluid tight seal. Alternatively, the inner surface of the stationary equipment can be free of grooves, and the sealing bosses 26A can form a fluid-tight seal by contacting an opposed axially extending surface. An example of the outer surface 26 free of the boss elements 26A is show for example in FIG. 9. Those of ordinary skill in the art will readily recognize that the outer surface 26 can include any selected number or type of static sealing surface features, and the surface features can have any selected shape or size. Moreover, the outer surface 26 can have any suitable shape or design, and can include for example multiple stepped surfaces. The main body 22 of the stationary element 20 can also have an axially innermost end wall surface 28 that is configured to seat against a radially extending end wall surface 14B of the stationary equipment 14.

The stationary element has an inner extending surface. The inner extending surface can be formed by multiple different axially extending surfaces. For example, the stationary element 20 can include an axially outermost or outboard end 30 that has a first generally axially extending inner surface formed by inner axially extending surfaces 32A and 32B that are connected together by a radially extending stepped wall 34. The main body 22 also includes a radially extending sealing surface 36 for forming a sealing surface with a valve element 120 of the rotary element 60. The stationary element 20 further includes a radially innermost axially extending second inner surface 38 that terminates in a flange portion 40. The flange portion 40 can include a pair of radially inwardly extending flange or rib elements 40A, 40B that are spaced apart to form a channel 42 therebetween. The flange elements 40A, 40B extend radially inwardly toward the shaft 12. One of ordinary skill in the art will readily recognize that the inner surface of the stationary element 20 can have any suitable shape and design, and can include any selected number and type of surface features. The second inner surface 38 can also include or have formed therein one or more channels or grooves that are positioned and configured to cooperate with one or more surface features formed on the rotary element 60 to help form a labyrinth path. According to one embodiment, the inner surface 38 can include channels 44A and 44B for seating corresponding surface features of the rotary element 60. Moreover, the shape and design of the surface features of the rotary element 60 helps concentrate localized sealing forces against the stationary equipment surfaces to produce a static seal. In addition, the surface features can help secure the stator and rotor components in place relative to the equipment bore and shaft, respectively. The labyrinth seal is capable of creating a seal and preventing contaminants from reaching the fluid within the housing by creating a complicated labyrinth path for liquids and contaminants to pass through, thus making it challenging for them to cross the barrier created by the seal because they have difficulty passing or traversing through the labyrinth. The labyrinth path can include the space created between the rotary and stationary elements.

The illustrated rotary element 60 is disposed within a space defined by the stationary element 20 when mounted with the stationary equipment 14 and can be coupled to the shaft 12 by the clamping mechanism 90 so as to rotate therewith. The rotary element 60 has a main body 62 that has an axially extending inner surface 64 for contacting an outer surface of the shaft. The rotary element 60 also includes a top surface 66 and a generally axially extending outer surface. The top surface 66 can have any selected type of surface feature formed thereon. For example, the surface feature can include one or more grooves, channels, or indentations, or can include any selected type of protrusion, such as one or more ribs or extensions. The outer surface includes a first axially extending outer surface 68 and a radially inwardly stepped second axially extending outer surface 70. The outer surfaces 68 and 70 are coupled together via a radially extending stepped wall surface 72. The second outer surface 70 has integrally formed thereon a valve element 120 for providing supplemental sealing between the stationary element 20 and the rotary element 60. Specifically, the valve element 120 includes an annular main body that has at a radially outermost terminal end a flange element 122 formed thereon. The flange element 22 can have any suitable shape and design. The valve element 120 during use functions as a secondary or supplemental sealing mechanism that further helps prevent contaminates from entering the housing. The valve element 120 is movable between a contacting position where the flange element 122 contacts the stationary sealing surface 36, and a non-contacting position where the flange element is positioned away from the sealing surface. The valve element 120 is movable between these two positions by the rotation of the shaft 12.

The outer surface of the rotary element 60 further includes a generally axially extending third outer surface 74. The outer surface 74 can have one or more surface features associated therewith that are aligned with and complementary in shape to the surface features associated with the inner surface 38 of the stationary element 20. For example, the outer surface 74 of the rotary element can include surface features, such as ribs 76A and 76B, that are aligned with, and optionally can seat at least partially within, the grooves 44A and 44B formed on the inner surface 38 of the stationary element 20. The surface features of the rotary element 60 can have any selected size and shape. According to alternate embodiments, the outer surface 74 of the rotary element 60 can include one or more grooves or channels and the inner surface 38 of the stationary element 20 can include or more protruding surface features. Moreover, the outer surface 74 can have any suitable shape or design, and can include for example multiple stepped surfaces. The ribs 76A and 76B and the channels 44A and 44B form part of the labyrinth path.

The top surface 66 of the rotary element 60 can have a surface feature associated therewith. The surface feature can be complementary in shape to a surface feature associated with a bottom surface of the clamping assembly 90. Further, the illustrated rotary element 60 can include an outboard portion 80 that extends axially outwardly from the top surface 66 and is configured for engaging with the clamping assembly 90. Specifically, the outboard portion 80 can include an outer surface 82 that has one or more surface features associated therewith. The surface features can be complementary in shape to surface features formed along an inner surface of the clamping assembly 90. According to one embodiment, the top surface 66 has a channel 78 formed therein for seating a portion of the clamping mechanism, and the surface features formed on the outer surface 82 of the outboard portion 80 can include a plurality of channels 84 for seating the surface features of the clamping mechanism 90.

Figure 7:
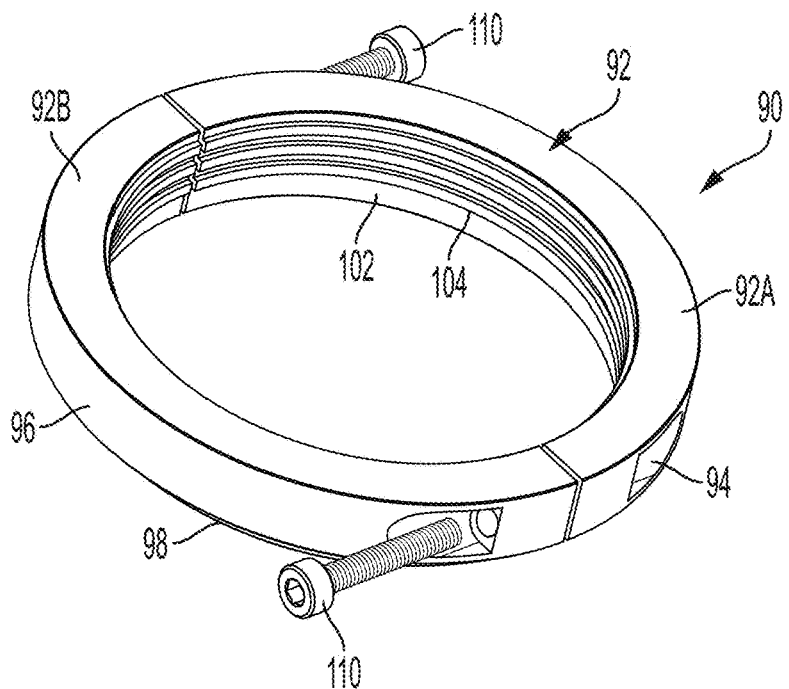
FIG. 7 is a perspective view of an assembled clamping mechanism of the labyrinth seal assembly of the present invention.
Figure 8:
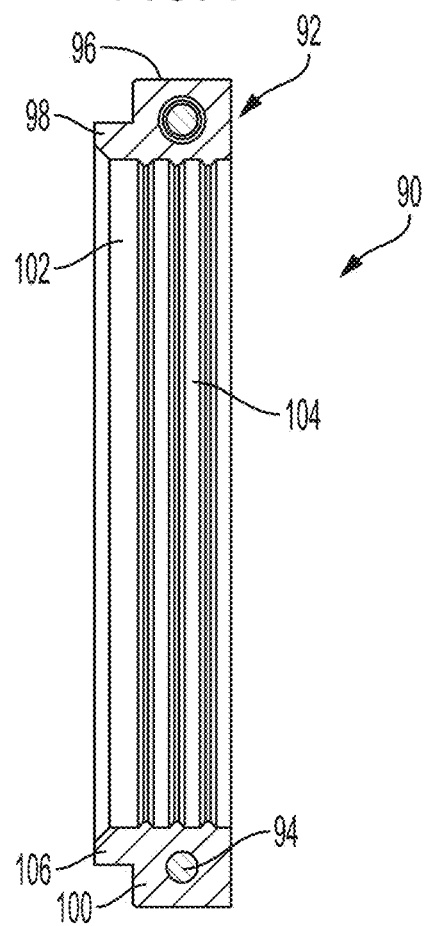
FIG. 8 is an end view of a segment of the clamping mechanism of the labyrinth seal assembly of the present invention.

The clamping assembly 90 is shown in detail in FIGS. 7 and 8. The clamping assembly 90 can include an annular main body 92 that is split in any selected manner and configuration to form a pair of clamping segments 92A, 92B. Each of the segments can have formed at each opposed terminal end a fastener receiving aperture 94 formed in the end face and suitable cut-outs formed in the main body for receiving a fastener 110. The fasteners 110 secure the clamping segments 92A, 92B together. The main body 92 can include a generally axially extending outer surface that includes a first outer surface 96 and a second outer surface 98 that are coupled together via a radially inwardly stepped wall surface 100. The main body 92 also has a generally axially extending inner surface 102. According to one embodiment, the inner surface 102 can include one or more surface features 104 for interacting with the surface features formed in the outer surface 82 of the outboard portion 80. The surface features can include one or more protruding elements, such as ribs 104, that are configured for seating at least partially within the surface features, such as the channels 84, that are formed in the outer surface 82 of the outboard portion 80 of the rotary element 60, such that the clamping mechanism 90 and the rotary element 60 can engage and nest together. The clamping segments 92A, 92B can be secured together via the fasteners 110, and when tightened, can secure the rotary element 60 to the shaft 12. Those of ordinary skill in the art will readily recognize that the surface features 104 can be of any types and can have any selected size or shape. Further, any selected number of surface features can be provided or associated with the inner surface 102. The axially inboard portion of the clamping assembly 90 formed by the outer surface 98 and a lower area of the inner surface 102 forms a projection 106 (e.g., surface feature) that extends from a bottom surface (e.g., the stepped wall surface 100) of the clamping assembly and is configured to seat within the channel 78 formed in the top surface 66 of the rotary element 60. Thus, the projection 106 and the channel 78 can have complementary shapes such that the surface features can engage and nest together. The projection 106 thus forms an additional mechanism for securing together the clamping assembly 90 and the rotary element 60.

The rotary element 60 and the stationary element 20 can be formed into a pair of segments, each of which has an end face. The end faces, for example, of the rotary seal element, the stationary seal element, and/or the clamping segments can be configured to have non-flat surface features that allow the aligned end faces of the opposed segments to engage with each other to prevent axial movement relative to each other. The non-flat surface features thus form an interlocking mechanism. The interlocking mechanism can have any selected profile shape, including for example a V-shape, a chevron shape, and the like.

Figure 4:
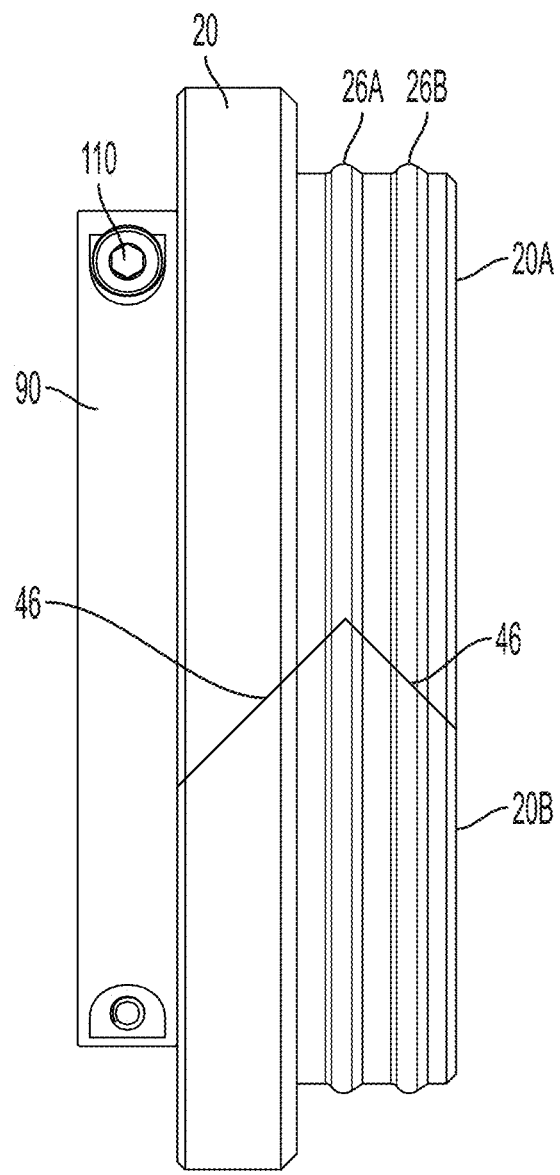
FIG. 4 is a side view of the assembled labyrinth seal assembly of the present invention prior to installation about the shaft and seated within the stationary equipment.
Figure 5:
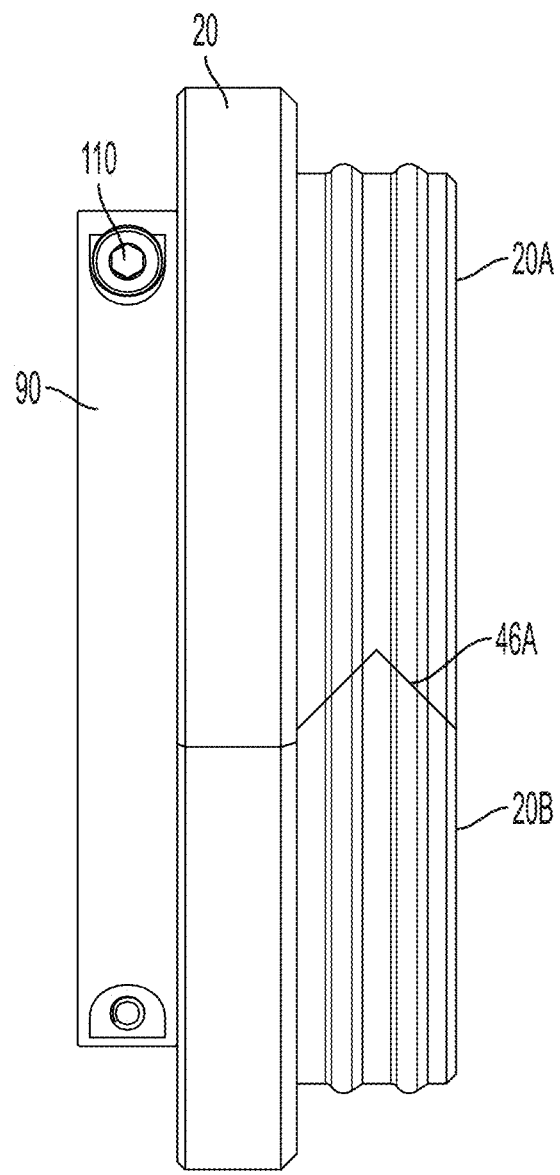
FIG. 5 is a side view of the assembled labyrinth assembly of the present invention illustrating another embodiment of the combination straight and V-shaped split in the stationary element.
Figure 6:
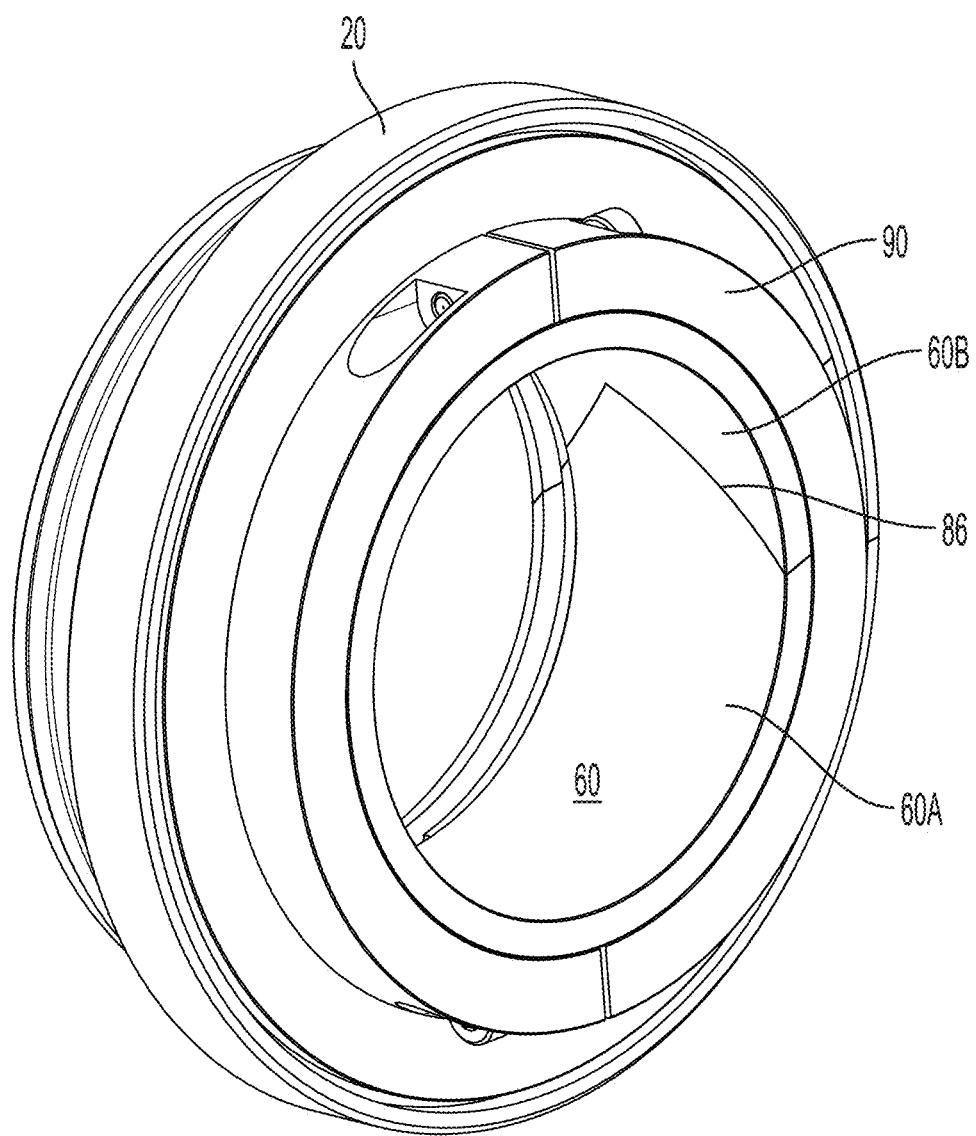
FIG. 6 is a perspective view of the assembled labyrinth assembly of the present invention illustrating the combination straight and V-shaped split in the rotary element.

As shown in FIGS. 4-6, the stationary and rotary elements (e.g., seal ring elements), as well as the clamping segments, can be split into segments to form non-flat interlocking end faces. Conventional split seal ring segments have exposed axial end faces that are relatively smooth and flat. Since the axial faces are flat, they easily move relative to each other in the axial and radial directions. This oftentimes makes it difficult to align the seal ring segments together during installation. According to the present invention, at least the stationary and rotary elements each include a pair of split seal ring segments that have non-flat, axially extending end faces that interlock with the corresponding seal ring face on the opposed seal ring segment. As used herein, the term "non-flat" is intended to cover a ring end face that has more than a nominal amount or degree of surface feature(s) that are independent of any features that may be formed on the split surfaces as a result of the grain structure of the material of the seal rings. The axial end faces are deemed to be non-flat if a surface feature other than natural material grain vagaries exists on the axial end faces when the end face is viewed in the axial direction, from the axially outermost to the axially innermost surface of the axial end face, and in the radial direction, from the radially outermost to the radially innermost surfaces of the end face. For example, the end faces are deemed to have a non-flat end face when they incorporate or include a surface feature that has an inclined shape, a declined shape, a V-shape, a zig-zag style shape (when viewed in cross-section), a curved or non-linear shape, a chevron cut, an arrow shaped cut, a channel or groove, a protrusion, or any other suitable non-flat shape. The present invention also contemplates having a plurality of surface features formed on the end face either above or below (or both) the surface of the axial end face. The opposed axial end faces on the opposed seal ring segments when disposed in confronting relationship relative to each other preferably has a shape that is complementary to this shape. When placed together, the seal ring segments interlock and are hence self-aligning. The non-flat nature of the axial seal ring end faces of the seal ring segments enables the segments to interact with each other in such a manner as to facilitate engagement of the segments with each other while concomitantly reducing or preventing sliding of the segments relative to each other, especially in the axial direction. FIG. 4 illustrates the stationary element 20 having a split 46 formed therein to form the seal ring segments 20A, 20B. The split 46 forms the stationary seal ring segments 20A, 20B each of which has a pair of non-flat end faces. The non-flat end faces preferably include non-flat surface features, that is, any surface feature other than a straight flat cut forming the end faces. The non-flat surface feature can any selected shape or configuration. The illustrated non-flat surface features formed on the non-flat end faces forms a generally arrow shape. As such, one of the segments 20A includes a cut-out formed in the end faces and the end faces of the other segment each include a complementary shaped angled protrusion. By way of another example, as shown in FIG. 5, the non-flat split 46A formed along the end faces of the seal ring segments 20A, 20B has a chevron-shape. FIG. 6 is a perspective view of the labyrinth seal assembly 10 showing that the rotary element 60 can also include a non-flat split 86 to form the seal ring segments 60A, 60B. The seal segments 60A and 60B each include a non-flat end face, similar to the end faces on the rotary element segments 20A, 20B.

The stationary element and the rotary element can be formed from any suitable material and is preferably formed from an elastomeric material, such as rubber, polyurethane, silicon based material, polymer material, fluorocarbon material, and the like, a plastic material (e.g., polyurethane, nylon, acetal, or polytetrafluoroethylene (PTFE)), or from a metal material.

Figure 10:
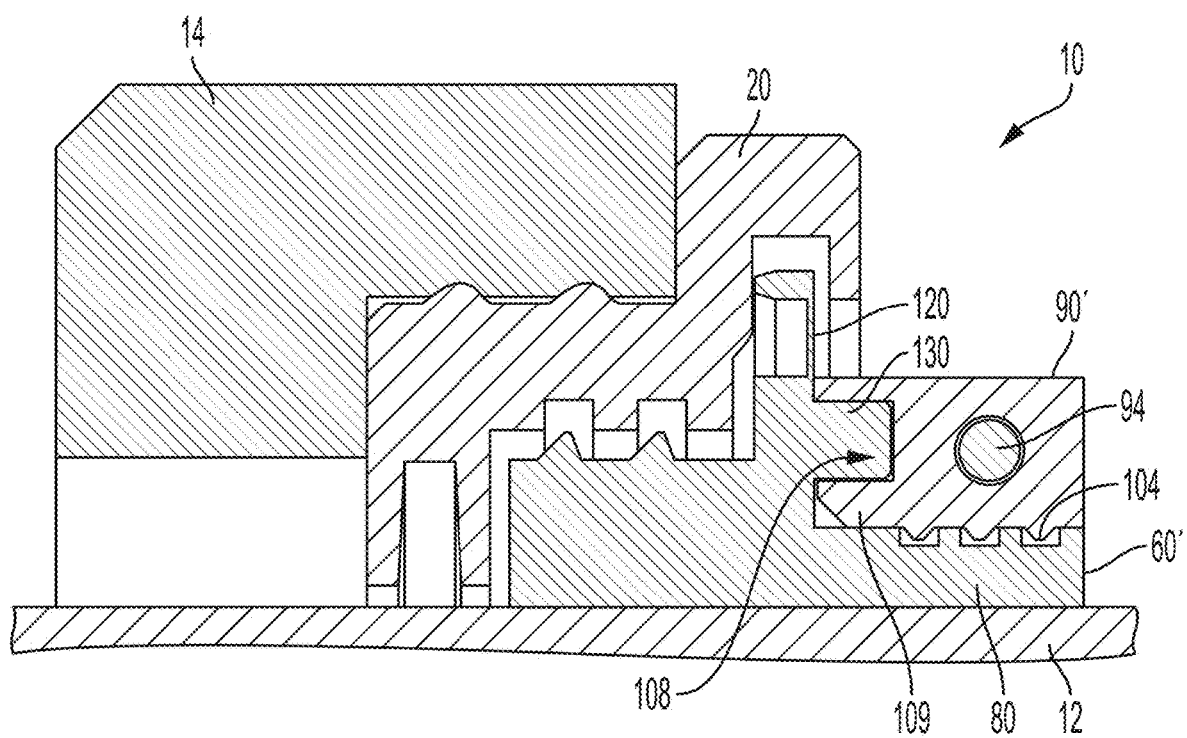
FIG. 10 is a partial cross-sectional view of a second embodiment of the labyrinth seal assembly according to the teachings of the present invention.
Figure 11:
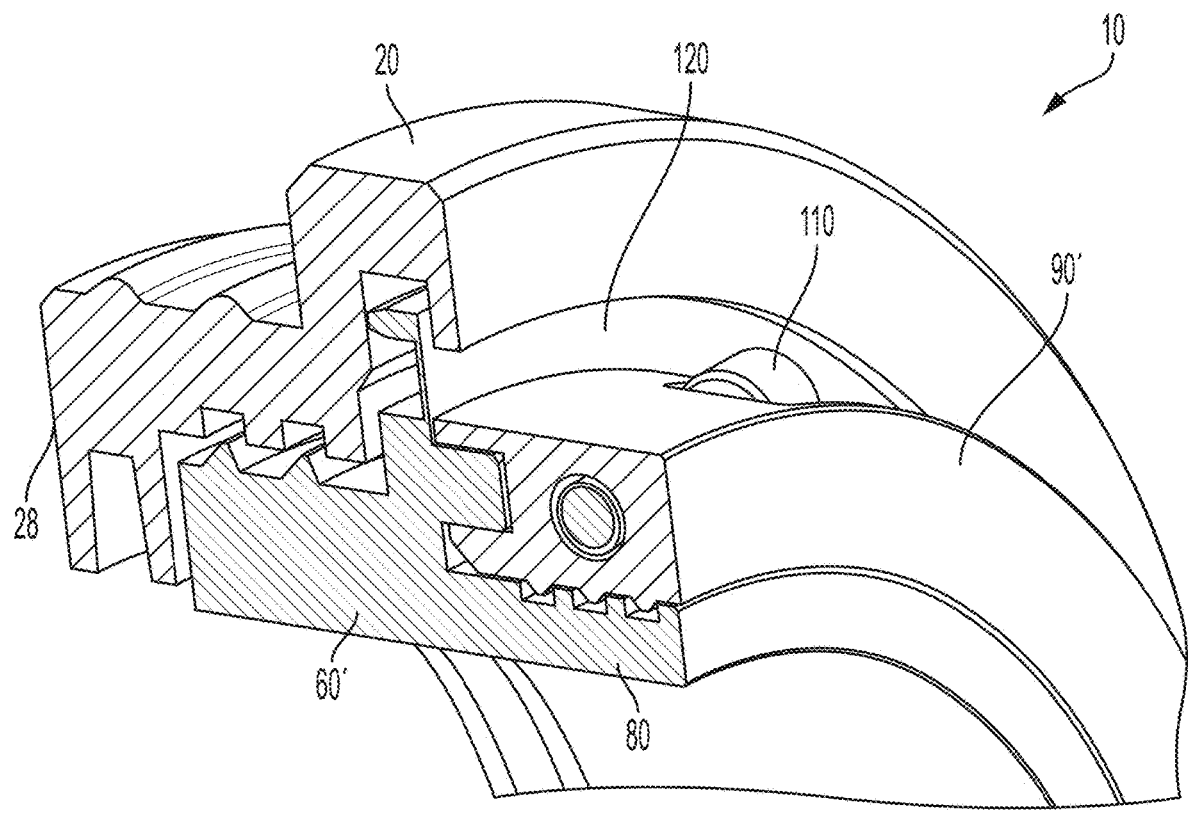
FIG. 11 is a partial cross-sectional perspective view of the second embodiment of the labyrinth seal assembly of FIG. 10 according to the teachings of the present invention.
Figure 12:
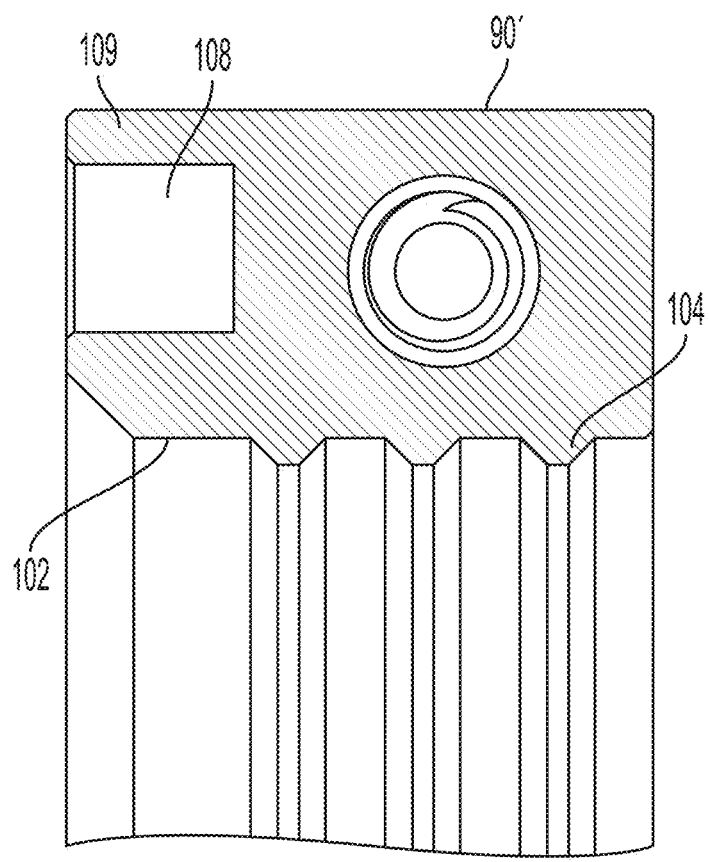
FIG. 12 is a partial cross-sectional view of the clamping mechanism of the labyrinth seal assembly of FIG. 10 according to the teachings of the present invention.
Figure 13:
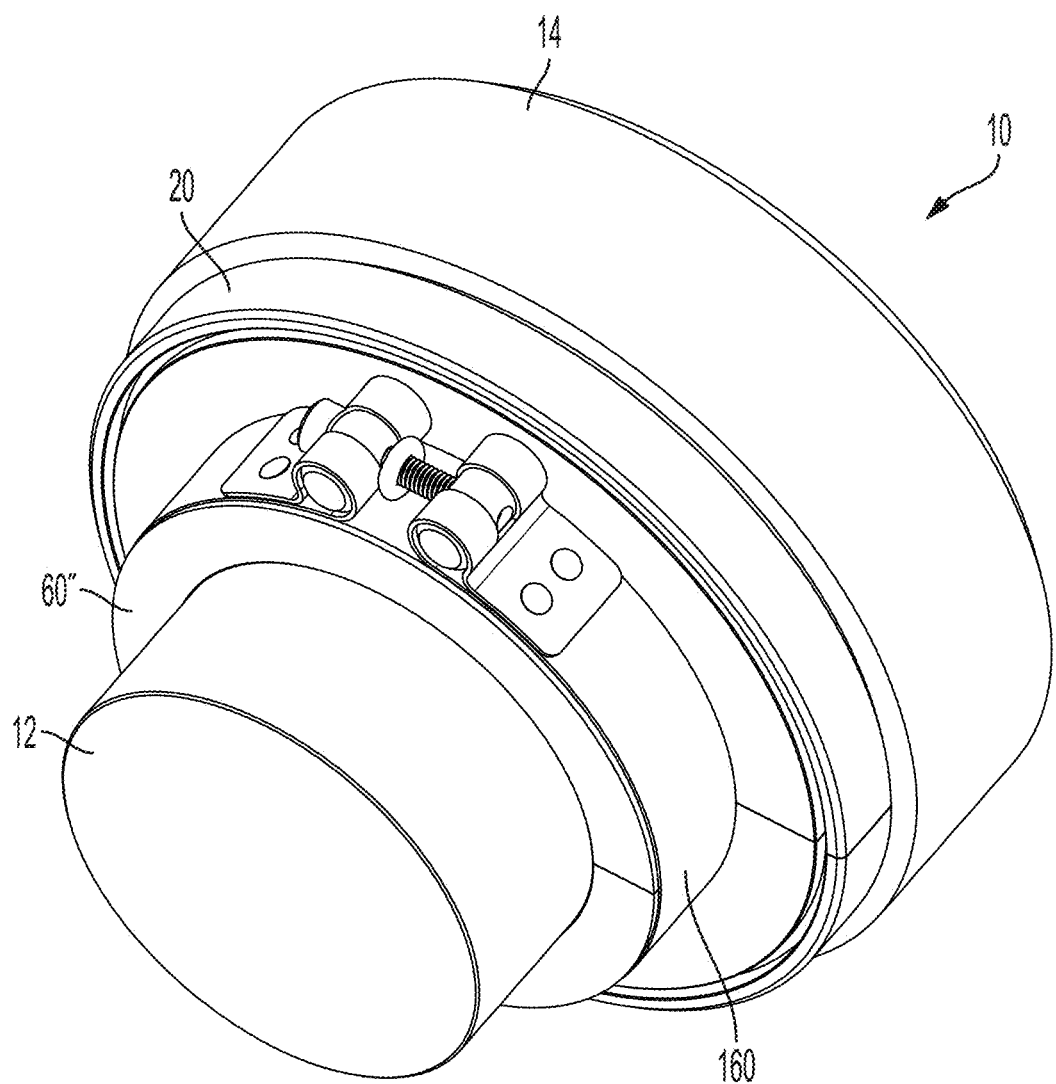
FIG. 13 is a perspective view of another embodiment of the labyrinth seal assembly according to the teachings of the present invention.
Figure 14:
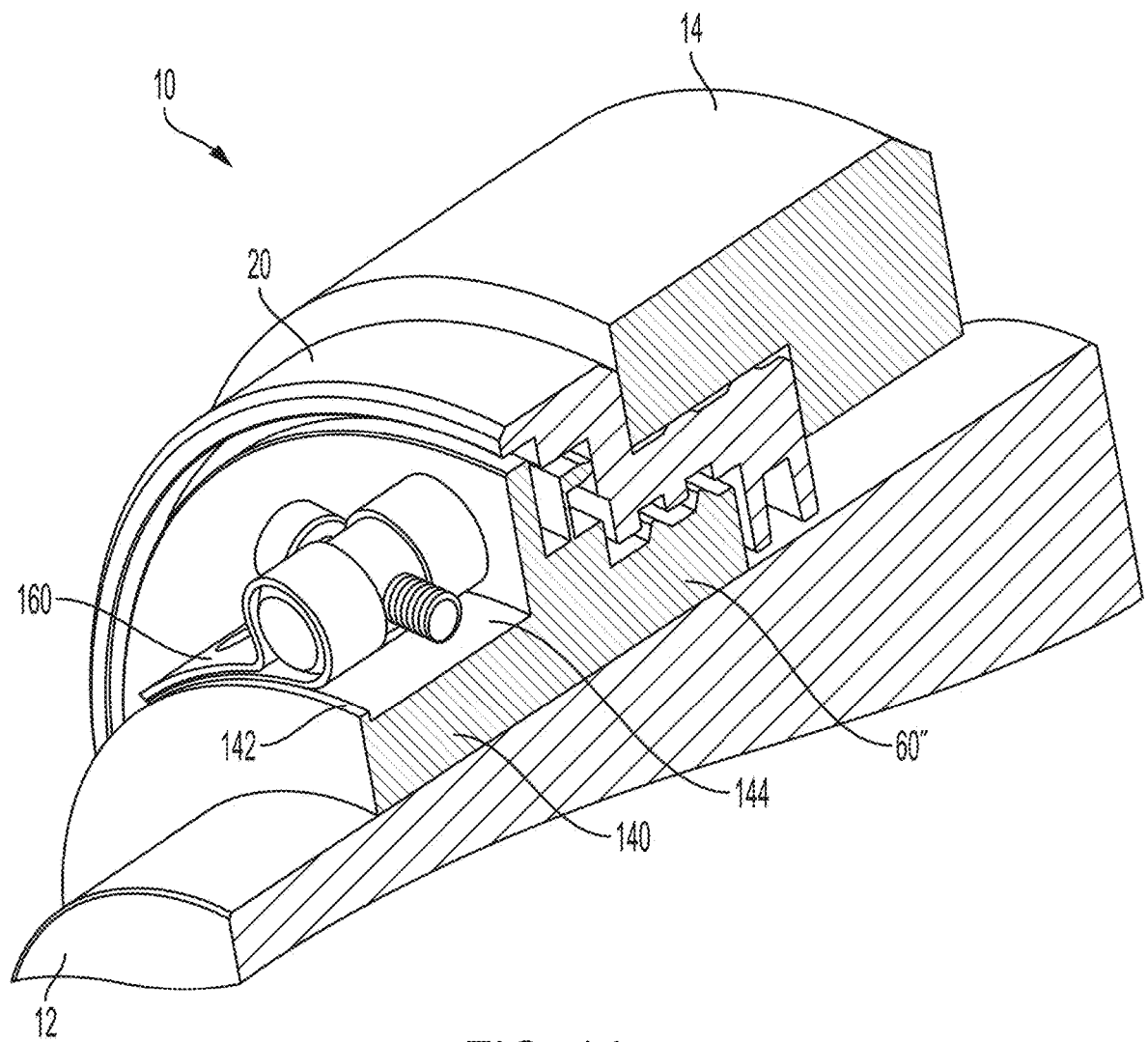
FIG. 14 is a partial cross-sectional perspective view of the labyrinth seal assembly of FIG. 13 according to the teachings of the present invention.
Figure 15:
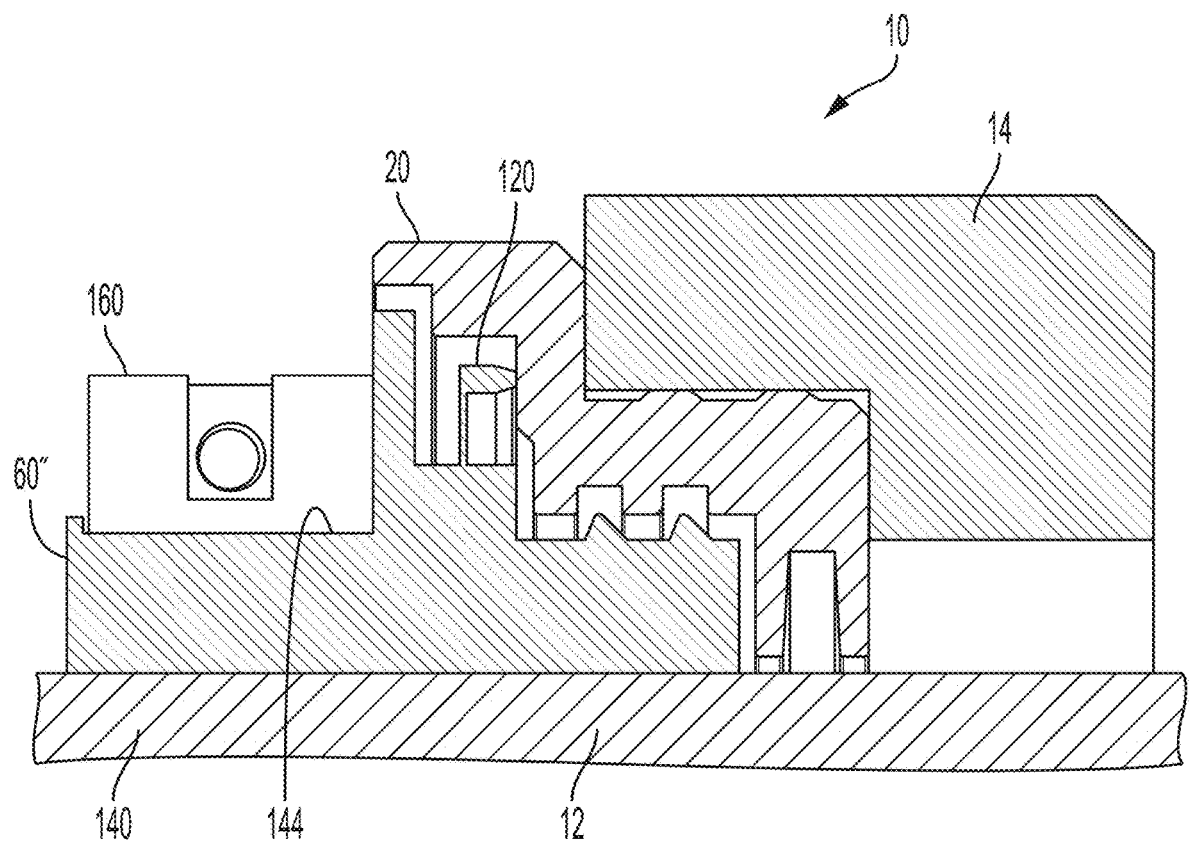
FIG. 15 is a partial cross-sectional view of the labyrinth seal assembly of FIG. 13 according to the teachings of the present invention.
Figure 16:
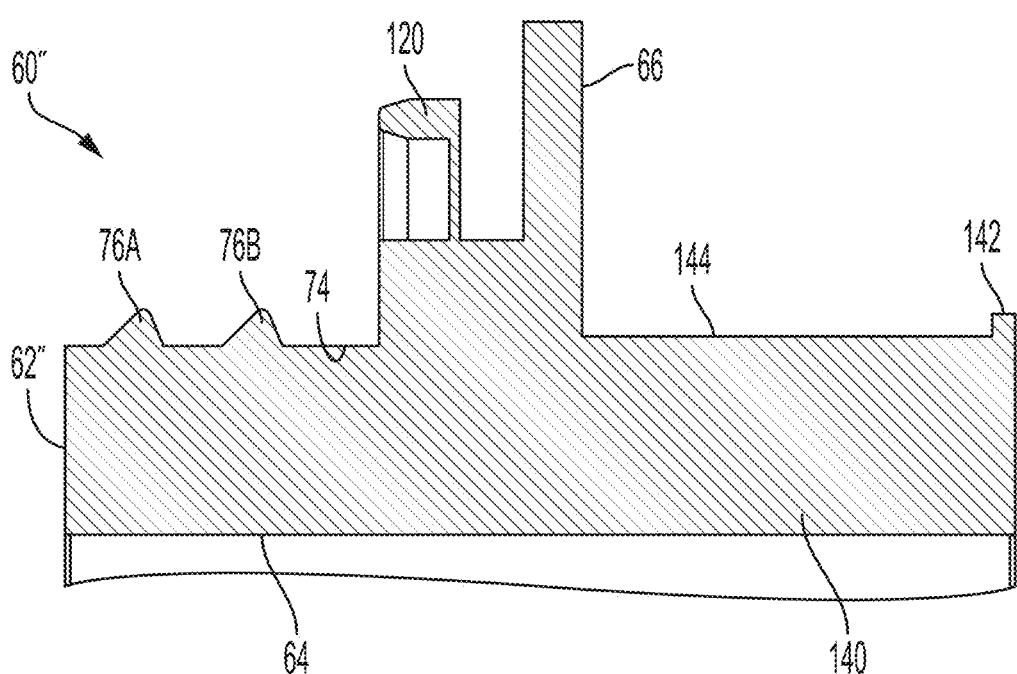
FIG. 16 is a partial cross-sectional view of the rotary element of the labyrinth seal assembly of FIG. 13 according to the teachings of the present invention.

A second embodiment of the labyrinth seal assembly 10 of the present invention is shown for example in FIGS. 10-12. Like reference numerals indicate like parts throughout the various views. The illustrated labyrinth seal assembly 10 includes a rotary element 60' that is coupled to the shaft 12 by the clamping mechanism 90'. The stationary element 20 is mounted within the stationary equipment 14 and is disposed about the rotary element 60'. The illustrated rotary element 60' is similar in construction to the rotary element 60, except for the configuration of the top surface 66. The surface feature of the top surface 66 is replaced with a different surface feature in the form of an axially extending projection 130. The illustrated clamping mechanism 90' is similar in construction to the clamping mechanism 90, except that the bottom portion or projection 106 extending from the bottom surface is replaced by a channel 108 formed in the axially inward bottom end 109 (e.g., a bottom surface). The projection 130 of the rotary element 60' is sized and shaped to seat within and engage with the channel 108 formed in the bottom end 109 of the clamping mechanism 90'. When assembled, the surface features nest together. Those of ordinary skill in the art will readily recognize that the projection 130 and the corresponding channel 108 can have any selected size and shape.

FIGS. 13-19 illustrate another embodiment of the labyrinth seal assembly 10 of the present invention. Like reference numerals indicate like parts throughout the various views. The illustrated labyrinth seal assembly 10 forms a seal between the shaft 12 and any associated stationary equipment 14. As shown for example in FIGS. 13-16, the illustrated labyrinth seal assembly 10 employs a stationary element 20 that is housed within the stationary equipment 14, a rotary element 60" that is coupled to the rotating shaft 12, a valve element 120 that is integrally formed with the rotary element 60" and is configured to operatively interact with the stationary element 20 so as to form a seal therebetween, and a clamping mechanism 160 that serves to clamp the rotary element 60" to the shaft 12. The stationary element 20 is coupled to the stationary equipment 14 and is seated therein. The rotary element 60" is coupled to the rotating shaft 12 by the clamping mechanism 160. The rotary element 60" is similar in construction to the rotary element 60 of FIG. 3, except that the outboard portion 140 has a different configuration. Specifically, the outer surface 142 of the outboard portion 140 has a channel 144 formed therein for seating a main body of the clamping mechanism 160 when mounted therein. As such, the channel 144 is configured to accommodate the width of the clamping mechanism 160.

Figure 17:
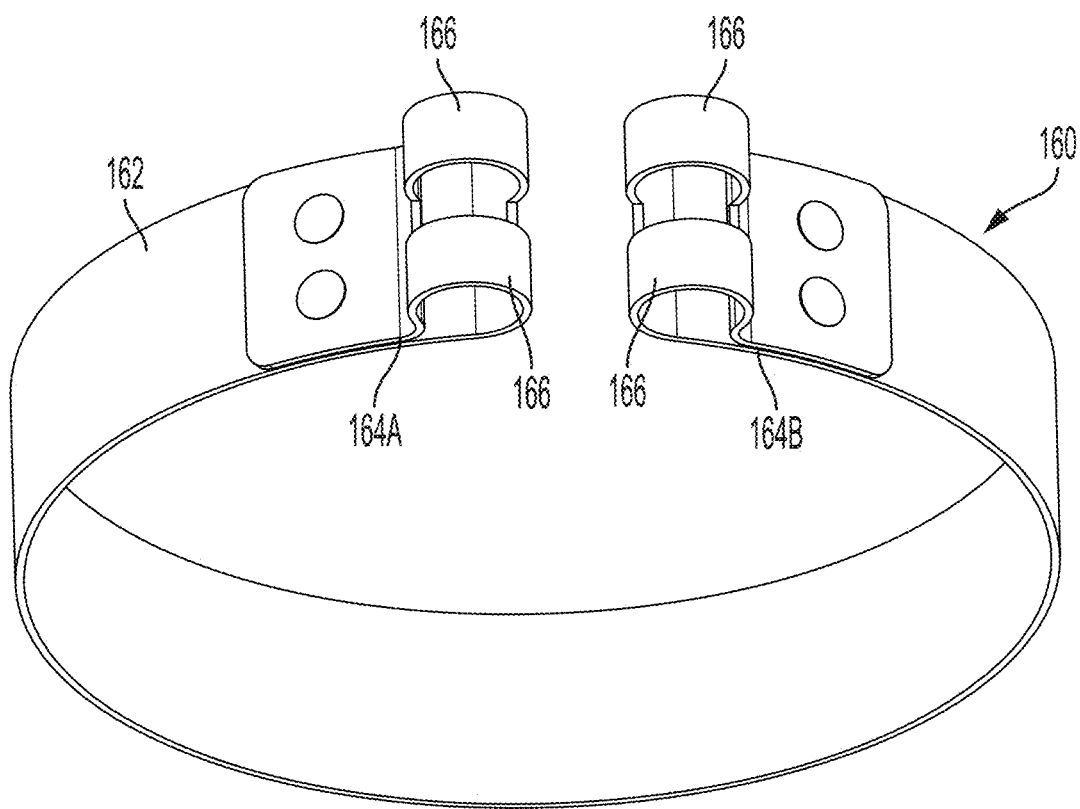
FIG. 17 is a perspective view of the clamping mechanism without the securing assembly of the labyrinth seal assembly of FIG. 13 according to the teachings of the present invention.
Figure 18:
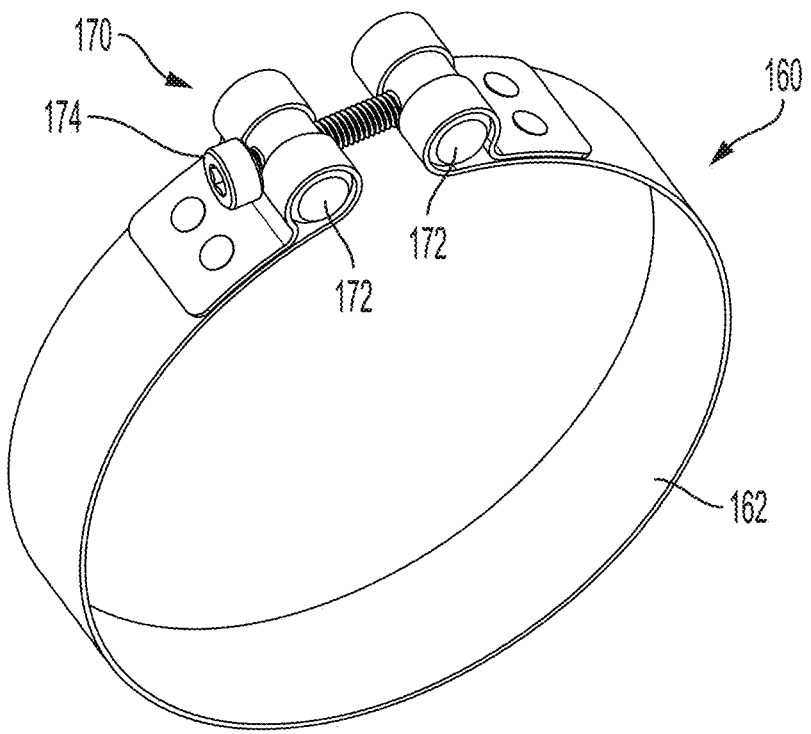
FIG. 18 is a perspective view of the clamping mechanism of the labyrinth seal assembly of FIG. 13 according to the teachings of the present invention.
Figure 19:
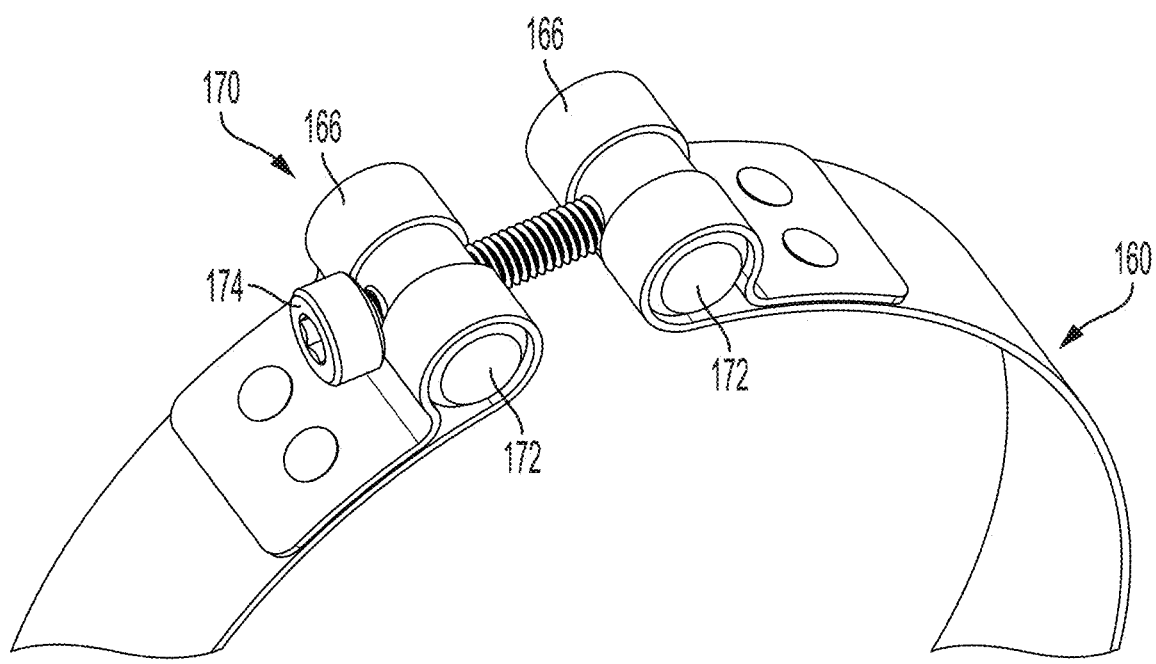
FIG. 19 is a partial perspective view of the clamping mechanism of the labyrinth seal assembly of FIG. 13 according to the teachings of the present invention.

The clamping mechanism 160 is shown in further detail in FIGS. 17-19. The illustrated clamping mechanism includes a main body 162 that has a circular or annular shape, and hence is generally configured as a band clamp. The main body 162 has a pair of terminal ends or end portions 164A, 164B that are disposed adjacent to each other. The terminal ends each include a retention mechanism. In the illustrated embodiment, the retention mechanism can include a pair of loop elements 166, 166. Those of ordinary skill in the art will readily recognize that the retention mechanism can be of any selected type and can have any selected shape. The loop elements are configured to engage with at least a portion of a securing assembly 170. The securing assembly can include, for example, a pair of barrel nuts 172, 172 and a fastener element 174. The barrel nuts 172, 172 include a fastener receiving aperture that is sized and configured for receiving the fastener element 174. The fastener 174 can be tightened so that the terminal ends 164A, 164B of the clamping mechanism are moved closer together. The movement of the terminal ends 164A, 164B towards each other serves to secure the rotary element 60" to the shaft 12.

In operation, the labyrinth seal assembly 10 of the present invention is mounted within the housing of the stationary equipment 14. To that end, the stationary element 20 is mounted within the housing 14. The rotary element 60 is then mounted over the shaft 12 and positioned relative to the stationary element 20 so as to form a selected gap between the stationary and rotary elements. When positioned as such, the stationary and rotary elements form a non-contacting and hence frictionless sealing arrangement. The stationary and rotary elements 20, 60 operate as a primary sealing mechanism and create when assembled together a winding pathway (i.e., a labyrinth path) that extends between the ambient environment at an outboard end and the internal spaces of the mechanical housing, which typically contain one or more fluid reservoirs and associated process fluids. The winding labyrinth path helps trap particulates therein so as to minimize the number that reaches the internal spaces of the seal assembly and hence the internal spaces of the stationary equipment. Additionally, the labyrinth seal assembly 10 helps retain fluid, such as a process fluid, within the housing 14.

The valve element 120 is integrally formed on the second outer surface 70 of the rotary element 60. The flange element 122 of the valve element 120 is configured to selectively contact the sealing surface 36 of the stationary element 20. The valve element 120 is movable between a contacting position where the flange element 122 of the valve element contacts the sealing surface when the shaft is not rotating, and a non-contacting position where the flange element 122 does not contact (is positioned away from) the sealing surface 36 when the shaft is rotating. The valve element is thus movable between these two positions by the rotation of the shaft 12. The rotary element 60 is secured to the shaft 12 by a clamping mechanism 90. The clamping mechanism 90 can have surface features formed thereon that are configured to cooperate or are complementary in shape to surface features formed on or in the rotary element 60. The clamping mechanism 60 can be formed in a pair of clamp segments that can be secured together with one or more fasteners and about the rotary element 60. When tightened, the clamping mechanism serves to secure the rotary element to the shaft. Alternatively, the clamping mechanism 160 can be configured as a band clamp with a securing mechanism 170 for tightening and thus securing the rotary element 60 to the shaft 12.

Prior to startup operation of the mechanical device and hence prior to rotation of the shaft 12, the valve element 120 is disposed in the contacting position (i.e., shut-off position) where the valve element contacts the stationary element 20. Specifically, the valve element 120 is disposed within the space defined between the stationary and rotary elements and sealingly contacts the sealing surface 36 of the stationary element 20. The sealing surface thus functions in essence as a valve seat for the valve element 120. The valve element 120 thus helps form a secondary seal between the stationary element 20 and the rotary element 60 and helps prevent contaminants from entering into the stationary equipment 14 (such as into any oil/lubricant reservoir contained therein) from the ambient environment while concomitantly helping retain fluids therein. The stationary element 20 and the rotary element 60 of the labyrinth seal assembly 10 form a primary sealing mechanism that helps prevent contaminants from entering the housing and fluid from escaping by the labyrinth (i.e., winding path) that is formed by the stationary and rotary seal elements. The valve element, when employed as described above, performs much like a secondary or supplemental sealing mechanism by further preventing fluid leakage and contaminants from entering the housing when the shaft is stationary based on the sealing engagement between the valve element and the stationary element.

When the shaft starts to rotate, the valve element 120 transitions from the contacting position to the non-contacting position, and hence moves away from the sealing surface 36 in order to reduce drag and to prevent unwanted heat generation. As described above, the valve element 120 has an asymmetric design wherein the flange element 122 is coupled to a relatively thin main body. When the shaft is rotating, the centrifugal force generated by the shaft applies a moment force on the center of gravity of the valve element 120, such that the flange element 122 is lifted from the sealing surface 136 of the stationary element. The principles of operation of the valve element is described in U.S. Pat. No. 9,366,340, the contents of which are herein incorporated by reference. When the valve element 120 is disposed in the non-contacting position, the labyrinth seal assembly 10 still prevents contaminants from entering the housing because of the maze or labyrinth of passages that are formed between the seal components. Moreover, the rotational action of the shaft 12 further serves to trap contaminants to help retain fluid within the housing because centrifugal forces are imparted to the fluid coming in contact with the rotary element 60. The fluid is then thrown radially outward toward the channels (pathways) formed in the stationary element 20. During operation of the device, the fluid in general drains downwardly toward the bottom and then eventually drains back into the housing.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

We claim:

1. A labyrinth seal assembly for forming a seal between a shaft and a stationary equipment housing, comprising:
    a stationary element configured to be directly connected to the stationary equipment housing and having an annular shape defining a space through which the shaft extends, the stationary element being split into a first stationary element segment and a second stationary element segment, wherein each of the first and second stationary element segments have first and second non-flat end faces associated therewith,
    a rotary element disposed within the space between the stationary element and the shaft and coupled to the shaft so as to rotate therewith, the rotary element being split into a first rotary element segment and a second rotary element segment, wherein each of the first and second rotary element segments have first and second non-flat end faces associated therewith, wherein the rotary element has a radially outer surface having an integrally formed valve element extending radially outwardly therefrom, wherein the valve element is configured to selectively engage with the stationary element, and
    a clamping assembly disposed about the rotary element for directly contacting the outer surface of the rotary element and securing the rotary element to the shaft, wherein the clamping assembly has an axial and radial size that is smaller than the rotary element,
    wherein the valve element is disposed between the stationary element and the rotary element when assembled, and wherein the valve element is positioned relative to a portion of the stationary element to selectively form a seal, wherein the valve element is movable between a contacting position and a non-contacting position in response to rotation of the shaft, and wherein the valve element is adapted to contact the stationary element in the contacting position to form the seal when the shaft ceases rotation and the valve element is disposed in the non-contacting position when the shaft rotates.

2. The labyrinth seal assembly of claim 1, wherein the rotary element comprises
    a main body having an inner surface, an opposed outer surface, a top surface having a surface feature associated therewith, and an outboard portion extending axially outwardly from the top surface, and
    wherein the clamping assembly has a main body having a bottom surface having a surface feature associated therewith that is complementary in shape to the surface feature of the top surface of the rotary element, such that the surface feature of the bottom surface of the clamping assembly is disposed in mating contact with the surface feature of the top surface of the rotary element.

3. The labyrinth seal assembly of claim 2, wherein the surface feature of the top surface of the rotary element is a channel and the surface feature of the clamping assembly includes a projection sized and dimensioned for seating in the channel.

4. The labyrinth seal assembly of claim 2, wherein the outboard portion of the rotary element includes an outer surface having one or more surface features associated therewith, and wherein an inner surface of the main body of the clamping assembly has one or more surface features associated therewith that are complementary in shape to the surface features of the outboard portion of the rotary element.

5. The labyrinth seal assembly of claim 4, wherein the surface features of the outer surface of the outboard portion of the rotary element include one or more channels, and wherein the surface features associated with the inner surface of the main body of the clamping assembly include one or more protrusions sized and dimensioned for seating at least partly in the channels of the outboard portion.

6. The labyrinth seal assembly of claim 4, wherein the non-flat end faces of the first stationary element segment include a cut-out and the non-flat end faces of the second stationary element segment include a protrusion that is complementary in shape to the cut-out, wherein the cut-out and the protrusion when assembled together prevent axial movement of the first and second stationary element segments relative to each other.

7. The labyrinth seal assembly of claim 6, wherein the non-flat end faces of the first rotary element segment include a cut-out and the non-flat end faces of the second rotary element segment include a protrusion that is complementary in shape to the cut-out, wherein the cut-out and the protrusion when mated together prevent axial movement of the first and second rotary element segments relative to each other.

8. The labyrinth seal assembly of claim 4, wherein the split forming the non-flat end faces of the first and second stationary element segments and the rotary element segments have a profile shape, when mated together, of an arrow or a chevron.

9. The labyrinth seal assembly of claim 4, wherein the surface feature of the top surface of the rotary element is an axially outwardly extending projection, and wherein the surface feature of the bottom surface of the main body of the clamping assembly includes a channel, such that the outwardly extending projection is disposed in mating contact with the channel formed in the bottom surface of the clamping assembly.

10. The labyrinth seal assembly of claim 9, wherein the surface features of the outer surface of the outboard portion of the rotary element include one or more channels, and wherein the surface features associated with the inner surface of the main body of the clamping assembly include one or more protrusions sized and dimensioned for seating at least partly in the channels of the outboard portion.

11. The labyrinth seal assembly of claim 10, wherein the non-flat end faces of the first stationary element segment include a cut-out and the non-flat end faces of the second stationary element segment include a protrusion that is complementary in shape to the cut-out, wherein the cut-out and the protrusion when mated together prevent axial movement of the first and second stationary element segments relative to each other.

12. The labyrinth seal assembly of claim 1, wherein the clamping assembly comprises
an annular main body having first and second end portions, wherein the first end portion includes a first retention mechanism and the second end portion includes a second retention mechanism, and
a securing assembly including
a first barrel nut sized and dimensioned for seating within the first retention mechanism of the first end portion and a second barrel nut sized and dimensioned for seating within the second retention mechanism of the second end portion, wherein each of the first and second barrel nuts has an aperture formed therein, and
a fastener element sized and dimensioned for seating within the apertures of the first and second barrel nuts.

13. The labyrinth seal assembly of claim 12, wherein each of the first and second retention mechanisms comprises first and second loop elements, and wherein the first barrel nut is sized and dimensioned for seating within the first and second loop elements of the first retention mechanism and the second barrel nut is sized and dimensioned for seating within the first and second loop elements of the second retention mechanism.

14. The labyrinth seal assembly of claim 13, wherein the rotary element has a main body having an inner surface, an opposed outer surface, and an outboard portion extending axially outwardly from a top surface, wherein the outboard portion has a channel formed therein on an outer surface that is sized and dimensioned for seating the annular main body of the clamping mechanism.

15. The labyrinth seal assembly of claim 14, wherein the fastener element, when mounted within the first and second barrel nuts and is tightened, couples the rotary element to the shaft.

* * * * *